US010723959B2

(12) United States Patent
Aramburo et al.

(10) Patent No.: US 10,723,959 B2
(45) Date of Patent: Jul. 28, 2020

(54) PROCESS FOR PRODUCING AROMATICS FROM A HEAVY HYDROCARBON FEED

(71) Applicant: SABIC Global Technologies B.V., Bergen op Zoom (NL)

(72) Inventors: Luis Aramburo, Geleen (NL); Dustin Farmer, Houston, TX (US); Scott A. Stevenson, Houston, TX (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/762,803

(22) PCT Filed: Sep. 15, 2016

(86) PCT No.: PCT/EP2016/071858
§ 371 (c)(1),
(2) Date: Mar. 23, 2018

(87) PCT Pub. No.: WO2017/055097
PCT Pub. Date: Apr. 6, 2017

(65) Prior Publication Data
US 2018/0282638 A1     Oct. 4, 2018

(30) Foreign Application Priority Data

Sep. 30, 2015   (EP) .................................... 15187655

(51) Int. Cl.
| | | |
|---|---|---|
| C10G 47/20 | (2006.01) | |
| B01J 29/12 | (2006.01) | |
| B01J 35/10 | (2006.01) | |
| C10G 47/18 | (2006.01) | |

(52) U.S. Cl.
CPC ............ C10G 47/20 (2013.01); B01J 29/126 (2013.01); B01J 35/1057 (2013.01); C10G 47/18 (2013.01); B01J 2229/16 (2013.01); C10G 2400/26 (2013.01); C10G 2400/28 (2013.01); C10G 2400/30 (2013.01)

(58) Field of Classification Search
None
See application file for complete search history.

(56) References Cited

U.S. PATENT DOCUMENTS

| | | | |
|---|---|---|---|
| 3,640,819 A | 2/1972 | Watkins | |
| 3,801,497 A | 4/1974 | Benner | |
| 4,738,941 A * | 4/1988 | Dufresne | C10G 47/16 502/66 |
| 5,342,507 A * | 8/1994 | Dai | B01J 29/166 208/111.15 |
| 7,326,332 B2 | 2/2008 | Chen et al. | |
| 7,513,988 B2 | 4/2009 | Oballa et al. | |
| 8,709,378 B2 * | 4/2014 | Lee | C01B 3/40 423/651 |
| 8,962,900 B2 | 2/2015 | Kim et al. | |
| 2007/0062848 A1 | 3/2007 | Oballa et al. | |
| 2007/0267324 A1 | 11/2007 | Dalloro et al. | |
| 2009/0292149 A1 | 11/2009 | Li et al. | |
| 2009/0314683 A1 * | 12/2009 | Matsushita | B01J 29/48 208/111.3 |
| 2010/0160699 A1 | 6/2010 | Frey et al. | |
| 2018/0265796 A1 | 9/2018 | Aramburo et al. | |
| 2018/0273857 A1 | 9/2018 | Aramburo et al. | |
| 2018/0280944 A1 | 10/2018 | Aramburo et al. | |

FOREIGN PATENT DOCUMENTS

| | | | |
|---|---|---|---|
| CN | 101094719 A | 12/2007 | |
| CN | 101177619 A | 5/2008 | |
| CN | 101348733 B | 1/2009 | |
| WO | 2005080532 A1 | 9/2005 | |
| WO | 2014122620 A1 | 8/2014 | |
| WO | 2015128018 A1 | 9/2015 | |
| WO | 2015128033 A1 | 9/2015 | |
| WO | WO-2015128018 A1 * | 9/2015 | ............. C10G 45/50 |

OTHER PUBLICATIONS

Ma et al., "Coupled hydrogenation and ring opening of tetralin on potassium modified Pt/USY catalysts", Catalysis Letters, vol. 116, Nos. 3-4, Aug. 2007. (Year: 2007).*
de Jong et al., "Zeolite Y Crystals with Trimodal Porosity as Ideal Hydrocracking Catalysts," Angew. Chem. Int. Ed. 2010, 49, 10074-10078.
European Search Report from the European Patent Office for European Application No. 15187655; Date of Completion: Mar. 29, 2016; 2 pages.
International Search Report for International Application No. PCT/EP2016/071858; Date of Completion: Dec. 12, 2016; dated Dec. 20, 2016; 2 Pages.
Kaduk, et al.(Crystal Structure of Zeolite Y as a Function of Ion Exchange, The Rigaku Journal, 1995, vol. 12, No. 2; 1995.
Karge et al., "Molecular Sieves: Science and Technology," vol. 3, (2002) pp. 204 -255.

(Continued)

*Primary Examiner* — Ali Z Fadhel
(74) *Attorney, Agent, or Firm* — Cantor Colburn LLP

(57) ABSTRACT

The present invention relates to a process for producing monoaromatic hydrocarbons from a hydrocarbon feed comprising polyaromatics, the process comprising contacting said feed in the presence of hydrogen with a M/A/zeolite catalyst under hydrocracking process conditions.

21 Claims, No Drawings

(56) References Cited

OTHER PUBLICATIONS

Kirk-Othmer Encyclopedia of Chemical Technology, "Molecular Sieves," (2006) pp. 811-853, Fifth Edition, vol. 16.
Ma et al, "Coupled hydrogenation and ring opening of tetralin on potassium modified Pt/USY catalysts," Catalysis Letters, vol. 116, Nos. 3-4, Aug. 2007, pp. 149-154.
Raichle et al., "Haag-Dessau Catalysts for Ring Opening of Cycloalkanes," Angew. Chem. Int. Ed. 2001, 40, No. 7, pp. 1243-1246.
Simanzhenkov et al., "Technology for Producing Petrochemical Feedstock from Heavy Aromatic Oil Fractions," Ind. Eng. Chem. Res. 2010, 49, 953-963, 11 Pages.
Written Opinion of the International Searching Authority for International Application No. PCT/EP2016/071858; Date of Completion: Dec. 12, 2016; dated Dec. 20, 2016; 6 Pages.
Zecevic et al., "Heterogeneities of the Nanstructure of Platinum/ Zeolite Y Catalysts Revealed by Electron Technology," ACS Nano, 2013, 7(4), pp. 3698-3705.
Cesana et al., "Conversion of Heavy Aromatic Hydrocarbons to Valuable Synthetic Feed for Steamcrackers," Oil and Gas European Maganzine Feb. 2008, pp. 89-94.

\* cited by examiner

PROCESS FOR PRODUCING AROMATICS FROM A HEAVY HYDROCARBON FEED

CROSS REFERENCE TO RELATED APPLICATIONS

This application is a 371 of International Application No. PCT/EP2016/071858 filed Sep. 15, 2016, which claims priority to European Application No. 15187655.4, filed Sep. 30, 2015, both of which are incorporated by reference in their entirety herein.

The present invention relates to a process for producing monoaromatic hydrocarbons from a hydrocarbon feed comprising polyaromatics, the process comprising contacting said feed in the presence of hydrogen with a M/A/zeolite catalyst under hydrocracking process conditions.

Processes for producing monoaromatic hydrocarbons from heavy hydrocarbon feeds have been previously described. For instance, US 2007/0062848 describes a process for hydrocracking a feed comprising not less than 20 weight % of one or more aromatic compounds containing at least two fused aromatic rings to produce a cracker feed. The process according US 2007/0062848 comprises an aromatic hydrogenation step and a separate ring cleavage step to produce a product stream comprising mainly C2-4 alkanes, but also some BTX is produced.

Ma et al. (2007) Catal Letters 116, 149-154 describe the coupled hydrogenation and ring opening of tetralin on potassium modified Pt/zeolite Y catalysts. The process of Ma et al. is characterized in that the BTX yield is relatively low. Ma et al. (2007) shows that the extent of successive cracking reactions can be reduced by introducing potassium into a Pt/zeolite Y catalyst. As a result thereof, however, the process of Ma et al. (2007) has a relatively high selectivity for non-aromatic C5-C9 hydrocarbons.

It was an object of the present invention to provide an improved process which allows the selective conversion of a heavy hydrocarbon feedstock comprising polyaromatics to monoaromatic hydrocarbons and which has a low selectivity towards unwanted side-products such as methane and/or lower paraffinic hydrocarbons such as LPG and non-aromatic C5-C9 hydrocarbons.

The solution to the above problem is achieved by providing the embodiments as described herein below and as characterized in the claims. Accordingly, the present invention provides a process for producing monoaromatic hydrocarbons from a hydrocarbon feed comprising polyaromatics, the process comprising contacting the feed in the presence of hydrogen with a M/A/zeolite catalyst at a pressure of ambient-40 bara, a temperature of 350-500° C., a WHSV of 0.1-10 $h^{-1}$ and a $H_2$/HC ratio of 1-20, wherein said M/A/zeolite catalyst comprises: 0.05-2.5 wt-% of element M, wherein said element M is one or more elements selected from Group 10 of the Periodic Table of Elements; 0.05-1 wt-% of element A, wherein said element A is one or more elements selected from Group 1 and 2 of the Periodic Table of Elements; and an aluminosilicate zeolite having a pore size of 6-8 Å and a $SiO_2/Al_2O_3$ ratio of 1-45.

In the context of the present invention, it was surprisingly found that by specifically selecting the M/A/zeolite catalyst of the present invention and selecting a pressure of ambient-40 bara, a temperature of 350-500° C., a WHSV of 0.1-10 $h^{-1}$ and a $H_2$/HC ratio of 1-20 as process conditions, a heavy hydrocarbon feed comprising polyaromatic hydrocarbon compounds can be more efficiently converted to monoaromatic hydrocarbons. Particularly, the production of unwanted side products such as methane and/or C5-C9 hydrocarbons can be reduced by selecting the process conditions as defined herein in combination with the catalyst of the present invention over a catalyst and process conditions as described in the prior art, such as Ma et al, which for instance involves a process temperature of 100-300° C.

Without being bound to theory, it is believed that the presence of a specific amount of element A in the catalyst composition is able to promote ring opening reactions of cyclic hydrocarbons as well as decrease successive cracking reactions leading the formation of ethane and methane.

The term "aromatic hydrocarbons" or "aromatics" is very well known in the art. Accordingly, the term "aromatic hydrocarbon" relates to cyclically conjugated hydrocarbon with a stability (due to delocalization) that is significantly greater than that of a hypothetical localized structure (e.g. Kekulé structure). The most common method for determining aromaticity of a given hydrocarbon is the observation of diatropicity in the 1H NMR spectrum, for example the presence of chemical shifts in the range of from 7.2 to 7.3 ppm for benzene ring protons. As used herein, the term "polyaromatics" or "polyaromatic hydrocarbons" relates to a mixture of aromatic hydrocarbons having more than one aromatic ring. As used herein, the term "monoaromatic hydrocarbons" or "monoaromatics" relates to a mixture of aromatic hydrocarbons having only one aromatic ring.

The term "BTX" as used herein relates to a mixture of benzene, toluene and xylenes. Preferably, the product produced in the process of the present invention comprises further useful aromatic hydrocarbons such as ethylbenzene. Accordingly, the present invention preferably provides a process for producing a mixture of benzene, toluene xylenes and ethylbenzene ("BTXE"). The product as produced may be a physical mixture of the different aromatic hydrocarbons or may be directly subjected to further separation, e.g. by distillation, to provide different purified product streams. Such purified product stream may include a benzene product stream, a toluene product stream, a xylene product stream and/or an ethylbenzene product stream.

As used herein, the term "C# hydrocarbons", or "C#", wherein "#" is a positive integer, is meant to describe all hydrocarbons having # carbon atoms. Moreover, the term "C#+ hydrocarbons" is meant to describe all hydrocarbon molecules having # or more carbon atoms. Accordingly, the term "C9+ hydrocarbons" is meant to describe a mixture of hydrocarbons having 9 or more carbon atoms. The term "C9+ alkanes" accordingly relates to alkanes having 9 or more carbon atoms.

The term "LPG" as used herein refers to the well-established acronym for the term "liquefied petroleum gas". LPG generally consists of a blend of C2-C4 hydrocarbons i.e. a mixture of C2, C3, and C4 hydrocarbons.

Accordingly, the process of the present invention involves contacting a hydrocarbon feed in the presence of hydrogen to a selective catalyst under specifically selected process conditions.

The hydrocarbon feed used in the process of the present invention comprises polyaromatics. The term "hydrocarbon feed" as used herein relates to the hydrocarbon mixture that is subjected to the process of the present invention. Preferably, the hydrocarbon feed used in the process of the present invention comprises at least 10 wt-% polyaromatics, more preferably at least 20 wt-% polyaromatics and most preferably at least 30 wt-% polyaromatics. Preferably, the hydrocarbon feed used in the process of the present invention is selected from the group consisting of heavy cycle oil, light cycle oil, carbon black oil, cracked distillate and pyoil.

The specifically selected process conditions used in the process of the present invention comprise a pressure of ambient-40 bara, a temperature of 350-500° C., a WHSV of 0.1-10 h$^{-1}$ and a "hydrogen to hydrocarbon" ratio (H$_2$/HC ratio) of 1-20.

Preferably, the process conditions comprise a pressure of 10-40 bara.

Preferably, the process conditions further comprise a temperature of 400-470° C., a WHSV of 0.5-2 h$^{-1}$ and a H$_2$/HC ratio of 3-10.

The selective catalyst used in the process of the present invention is described herein as a M/A/zeolite catalyst, wherein said M/A/zeolite catalyst comprises: 0.05-2.5 wt-% of element M, wherein said element M is one or more elements selected from Group 10 of the Periodic Table of Elements; 0.05-1 wt-% of element A, wherein said element A is one or more elements selected from Group 1 and 2 of the Periodic Table of Elements; and an aluminosilicate zeolite having a pore size of 6-8 Å and a SiO$_2$/Al$_2$O$_3$ ratio of 1-45.

Without being bound to theory, it is believed that when the content of element A comprised in the catalyst composition is too low (for instance less than 0.05 wt-%) this results in a non-effective covering of the strong acid sites, which is the intended objective to reduce extensive subsequent cracking reactions while promoting the extent of ring opening reactions of naphthenics. Furthermore, it is believed that when the content of element A comprised in the catalyst composition is too high (for instance more than 1 wt %) this results in an excessive covering of acid sites leading to a low ring opening and cracking activity.

Zeolites are well-known molecular sieves having a well-defined pore size. As used herein, the term "zeolite" or "aluminosilicate zeolite" relates to an aluminosilicate molecular sieve. An overview of their characteristics is for example provided by the chapter on Molecular Sieves in Kirk-Othmer Encyclopedia of Chemical Technology, Volume 16, p 811-853; in Atlas of Zeolite Framework Types, 5th edition, (Elsevier, 2001). Preferably, the catalyst comprises a large pore size aluminosilicate zeolite. Suitable zeolites include, but are not limited to, zeolite Y, faujasite (FAU), beta zeolite (BEA) and chabazite (CHA). The term "large pore zeolite" is commonly used in the field of zeolite catalysts. Accordingly, a large pore size zeolite is a zeolite having a pore size of 6-8 Å.

The aluminosilicate zeolite used in the process of the present invention has a SiO$_2$/Al$_2$O$_3$ ratio of 1-45. Means and methods for quantifying the SiO$_2$ to Al$_2$O$_3$ molar ratio of a zeolite are well known in the art and include, but are not limited to AAS (Atomic Absorption Spectrometer) or ICP (Inductively Coupled Plasma Spectrometry) analysis.

Preferably, the M/A/zeolite catalyst comprises an aluminosilicate zeolite having a SiO$_2$/Al$_2$O$_3$ ratio of 5-40. More preferably, the M/A/zeolite catalyst comprises an aluminosilicate zeolite having a SiO$_2$/Al$_2$O$_3$ ratio of 5-15.

Accordingly, element "M" as used herein is one or more elements selected from Group 10 of the Periodic Table of Elements. Preferably, the M/A/zeolite catalyst comprises 0.5-2 wt-% of element M. All weight percentages of element M as provided herein relate to the amount of element M in relation to the total catalyst composition. Preferably, element M is one or more elements selected from the group consisting of Pd and Pt. Most preferably, element M is Pt.

Accordingly, element A is one or more elements selected from Group 1 and 2 of the Periodic Table of Elements Preferably, the M/A/zeolite catalyst comprises 0.1-1 wt-% of element A. All weight percentages of element A as provided herein relate to the amount of element A in relation to the total catalyst composition. Preferably, element A is one or more elements selected from the group consisting of Na, K, Rb, Cs, Mg, Ca, Sr and Ba. More preferably, element A is one or more elements selected from the group consisting of Na, K, Rb and Cs. Most preferably, element A is K.

The catalyst composition as used in the process of the present invention may comprise further components such as a binder. Known binders include, but are not limited to silica, alumina and clay, such as kaolin. Alumina (Al$_2$O$_3$) is a preferred binder. The catalyst composition of the present invention preferably comprises at least 10 wt-%, most preferably at least 20 wt-% binder and preferably comprises up to 40 wt-% binder.

The catalyst composition is preferably formed into shaped catalyst particles by any known technique, for instance by extrusion.

Preferably, the aluminosilicate zeolite has a 12-ring structure. These specific aluminosilicate zeolites are well known to the skilled man. An overview of their characteristics is for example provided by the Atlas of Zeolite Framework Types, 5th edition, (Elsevier, 2001). Accordingly, an aluminosilicate zeolite having a 12-ring structure is an aluminosilicate zeolite wherein the pore is formed by a ring consisting of 12 [SiO$_4$] or [AlO$_4$]$^+$ tetrahedra.

Preferably, the aluminosilicate zeolite is zeolite Y. Depending on the silica-to-alumina molar ratio ("SiO$_2$/Al$_2$O$_3$ molar ratio" or "SiO$_2$/Al$_2$O$_3$ ratio") of their framework, synthetic faujasite zeolites are divided into zeolite X and zeolite Y. In X zeolites the SiO$_2$/Al$_2$O$_3$ ratio is between 2 and 3, while in Y zeolites it is 3 or higher. Accordingly, zeolite Y is a synthetic faujasite zeolite having a SiO$_2$/Al$_2$O$_3$ ratio in their framework of 3 or more. Preferably, the zeolite used in the process Preferably, the zeolite in the selective alkylation catalyst is in the so-called hydrogen form, meaning that its sodium or potassium content is very low, preferably below 0.1, 0.05, 0.02 or 0.01 wt-%; more preferably presence of sodium is below detection limits.

Preferably, the zeolite y is partially dealuminated. Preferably, the zeolite Y used in the process of the present invention has a SiO$_2$/Al$_2$O$_3$ ratio of 5-40. More preferably, the zeolite Y used in the process of the present invention has a SiO$_2$/Al$_2$O$_3$ ratio of 5-15. Preferably, the partially dealuminated zeolite is prepared by controlling SiO$_2$/Al$_2$O$_3$ ratio during zeolite synthesis. Alternatively, the zeolite may be partially dealuminated by a post-synthesis modification. Means and methods to obtain dealuminated zeolite by post-synthesis modification are well known in the art and include, but are not limited to the acid leaching technique; see e.g. Post-synthesis Modification I; Molecular Sieves, Volume 3; Eds. H. G. Karge, J. Weitkamp; Year (2002); Pages 204-255. The aluminosilicate zeolite may comprise super cages having a size of 12-14 Å. Means and methods for preparing zeolites comprising super cages are well known in the art and comprise zeolite post-treatments such as acid leaching and steaming, among others. (Angew. Chem., Int. Ed. 2010, 49, 10074, ACS nano, 4 (2013) 3698).

The process of the present invention produces monoaromatic hydrocarbons as a process product. Preferably, the process of the present invention produces at least 20 wt-% monoaromatic hydrocarbons of the total hydrocarbon process product, more preferably at least 25 wt-% monoaromatic hydrocarbons of the total hydrocarbon process product, and most preferably at least 30 wt-% monoaromatic hydrocarbons of the total hydrocarbon process product. Preferably, the process of the present invention produces less than 1.5 wt-% methane of the total hydrocarbon process product, more preferably less than 1 wt-% methane of the total hydrocarbon process product and most preferably less than 0.5 wt-% methane of the total hydrocarbon process product.

It is noted that the invention relates to all possible combinations of features described herein, particularly features recited in the claims.

It is further noted that the term "comprising" does not exclude the presence of other elements. However, it is also to be understood that a description on a product comprising certain components also discloses a product consisting of these components. Similarly, it is also to be understood that a description on a process comprising certain steps also discloses a process consisting of these steps.

Catalyst Preparation

Physical Mixtures:

The physical mixtures of hydrogenation and solid acid catalysts are composed of commercially available catalyst samples. The hydrogenation catalyst is a $Pt/Al_2O_3$ from UOP, namely R-12. The zeolite is an unmodified zeolite Y from Zeolyst, namely CBV 780. These samples have been mixed in the above mentioned experiments in a 1 to 1 ratio.

Bifunctional Pt/Zeolite Y Catalyst:

65 grams of Zeolyst CBV 780 are divided into 3 ceramic dishes and calcined in air at 100° C. for 3 hours to 300° C. and then to 550° C. for 10 hours using a ramp rate of 3° C./min.

After calcination, 15 grams of pre-dried sample are dispersed in 1 liter of deionized water and stirred at 65° C. overnight. The next day the temperature is raised to 70° C. and a solution of 0.317 g of $Pt(NH_3)_4 (NO_3)_2$ is dissolved in 76.4 g of DI-H20 and added drop wise over a period of 7 hours. The material is allowed to stir overnight at 70° C. prior to filtering off the liquid. The filter cake is re-suspended in 1 liter of fresh DI-H20 and allowed to stir for 15 min and subsequently filtered again. The washing step is repeated twice more. The material is then allowed to dry overnight on filter paper at room temperature. Next, the material is dried at 80° C. for 3 hours, pressed (10,000 psi), crushed and sieved (35-60 mesh sizing scheme). The sized material is loaded in a tube furnace with an air flow rate of 2.2 L/min. The furnace is heated to 100° C. for 3 hours then to 300° C. for 3 hours at a ramp rate of 0.2° C./min. Subsequently, the material is further calcined to 350° C. at 0.2° C./min for 3 hours. The flows rates are then turned down to down to 1 L/min for 1 hour then to 345 ml/min for 1 hour while 350° C. is maintained. The material is then transferred to the calcination oven and calcined for 3 hours in air using the same ramp rate of 0.2° C./min.

Modified Bifunctional Pt/K/Zeolite Y Catalyst:

24 grams of pre-dried CBV 712 are suspended in 2 liters of deionized water (DI-H20) and stirred at 40° C. overnight. Next day the temperature is raised to 70° C. and a solution of 0.602 g of $Pt(NH_3)_4 (NO_3)_2$ is dissolved in 123.33 g of DI-H20 and added drop wise over a period of 5 hours. The material is allowed to stir overnight at 70° C. prior to filtering off the liquid. The filter cake is re-suspended in 1 liter of fresh DI-H20 and allowed to stir for 15 minutes before filtering it again. This washing step is repeated twice more. The material is then allowed to dry at room temperature over the weekend. Next the material is pressed (10,000 psi), crushed and sieved through a 35-60 mesh sizing scheme. The sized material is loaded in a tube furnace with an air flow rate of 2.2 L/min. The furnace is heated to 100° C. for 3 hours then to 300° C. for 3 hours at a ramp rate of 0.2° C./min. Subsequently, the material is further calcined to 350° C. at 0.2° C./min for 3 hours. The flows rates are then turned down to down to 1 L/min for 1 hour then to 345 ml/min for 1 hour while 350° C. is maintained. The material is then transferred to the calcination oven and calcined for 3 hours in air using the same ramp rate of 0.2° C./min.

12 grams of the above described Pt/Zeolite Y catalysts are pre-dried, weighed and added to 0.342 g of KNOB dissolved in 700 ml of DI-H20. The material is stirred for 7 hours at 65° C. The material is then filtered and rinsed with 150 ml of fresh DI-H20 directly on the filter cake. The material is subsequently dried on a ceramic dish (100° C., 3 h) and calcined in air (0.2° C./min, 300° C., 3 h).

Experimental Set-Up

The experimental program was conducted on a fully automated 16-fold trickle-flow hydro process unit allowing uninterrupted catalyst testing. The operating range of this unit is summarized in Table.

The 16-fold trickle-flow hydro processing unit operates as follows: The feed is preheated and mixed with hydrogen prior to entering the evaporation zone located on the top part of the set-up. Therein the mixture is heated to the selected reaction conditions. The pressure in the reaction section is maintained with a nitrogen pressure hold gas system (PHG) at the reactor outlet. The reactor section is composed of a 5 mm internal diameter tube with an isothermal zone of 50 mm at the highest operating temperature. Once the reaction has taken place the effluent is sent to a condenser kept at 75° C. Therein the gas is separated from the liquid and sent to an online GC (every 90 min). The liquid collected during reaction is stored and subsequently analyzed offline in a GC-MS. Both, the gas and liquid flows are precisely measured to obtain the combined effluent composition.

TABLE 1

16-fold trickle-flow hydro processing unit specifications.
Set-up specifications

| | |
|---|---|
| Temperature | up to 500° C. |
| Pressure | up to 100 bara |
| Operation mode | Trickle-bed |
| Catalysts volume | up to 1.92 ml |
| Reactor inner diameter | 5 mm |
| Gases | $H_2$, $N_2$, Ar |

Model Feed Composition

The experiments have been carried out with a synthetic feed composed of paraffin's (25 wt %), mono-aromatics (20 wt %), di-aromatics (55 wt %) and tri-aromatics (5 wt %). This is summarized in table 2.

TABLE 2

Model feed composition details.
Model Feed

| | |
|---|---|
| Decane | 25 wt % |
| Propylbenzene | 20 wt % |
| Naphthalene | 25 wt % |
| 1-Methylnaphthalene | 10 wt % |
| 2-Methylnaphthalene | 15 wt % |
| Anthracene | 2 wt % |
| Phenantrene | 3 wt % |

Catalyst Preparation and Reactor Loading:

The series of catalysts tested displayed different sizes and shapes. To minimize the influence of external mass transfer limitations and compare the intrinsic reactivity of each catalyst, similar sieved fractions were used. To this end, zeolite powders were bound with alumina sol, dried, calcined and sieved to the desired size. The zeolite containing samples (namely, solid acid catalysts and/or bifunctional catalysts) were mixed in a 7 to 3 ratio with Dispersal® and the resulting mixture mixed with water (1 to 5 ratio). Subsequently, the slurry was milled (5 min, 600 rpm), dried in a hot box (110° C., overnight), calcined in air (300° C., 6 h) and sieved to a target fraction of 125-160 μm. On the other hand, the hydrogenation catalysts were milled and sieved to the same target fraction as the zeolite containing samples.

The catalysts were loaded in the reactors together with silicon carbide diluent to form a bed which is ring shaped around a thermowell. A thorough calibration was performed to determine the isothermal zone of the 16 parallel reactor set-up under the temperature conditions tested.

Activation Protocol

The activation and soaking protocol details are summarized in Table 3. After loading the catalyst in the reactor the activation procedure is performed to reduce the metal particles contained in the catalyst. Subsequently, the hydrogen feed is replaced by a mixture of hydrogen and the hydrocarbon feed used in the experiments while the sample is heated up slowly to reaction conditions. This is the so-called soaking procedure.

TABLE 3

Activation and soaking protocol details.

| Activation procedure | | Soaking procedure | |
| --- | --- | --- | --- |
| Temperature | 60-400° C. | Temperature | 60° C. |
| Heating ramp | 1° C./min, 2 h hold at 400° C. | WHSV | 2 h$^{-1}$ |
| | | Purge step | N$_2$ during 10 min |
| Purge step | N$_2$ during 10 min | H$_2$ flow | 10 (l/h) |
| Reduction step | H$_2$ | Pressure | 30 bara |
| | | Duration | 16 h |
| H2 flow | 41.5 (l/h) | | |
| Pressure | 30 bara | | |
| Duration | 460 min + Cool down | | |

Experimental Results

The physical mixture catalyst, bifunctional Pt/Zeolite Y catalyst and modified bifunctional Pt/Zeolite Y catalyst, all prepared as described herein above, were contacted with the model feed using the following reaction conditions: a WHSV of 1 h$^{-11}$, a H$_2$:HC ratio of 10 and a pressure of 30 bara and a=temperature of 400° C. or 450° C. The process was performed in a continuous system that operated in steady state conditions. In Table 4 the experimental results are describes as an average result of a measuring period of 24 h. Data were generated using GC-MS as described herein above.

TABLE 4

Experimental results

| catalyst | temperature (° C.) | Mono-aromatics (wt %) |
| --- | --- | --- |
| Pt/K/Zeolite Y | 400 | 30.8 |
| Pt/Zeolite Y | 400 | 26.8 |
| Physical mixture | 400 | 21.7 |
| Pt/K/Zeolite Y | 450 | 34.7 |
| Pt/Zeolite Y | 450 | 33.6 |
| Physical mixture | 450 | 28 |

The invention claimed is:

1. A process for producing monoaromatic hydrocarbons from a hydrocarbon feed comprising polyaromatics, the process comprising:
contacting the hydrocarbon feed in the presence of hydrogen with a M/A/zeolite catalyst at a pressure of ambient-40 bara, a temperature of 350-500° C., and a WHSV of 0.1-10 h$^{-1}$ to produce the monoaromatic hydrocarbons,
wherein said M/A/zeolite catalyst comprises
0.05-2.5 wt-% of element M, wherein said element M is one or more elements selected from Group 10 of the Periodic Table of Elements;
0.05-1 wt-% of element A, wherein said element A is one or more elements selected from Group 1 and 2 of the Periodic Table of Elements; and
the zeolite is an aluminosilicate zeolite having a pore size of 6-8 Å and a SiO$_2$/Al$_2$O$_3$ ratio of 1-45;
the hydrocarbon feed comprises at least 10 wt-% polyaromatics; and
said element A covers acid sites of the zeolite.

2. The process according to claim 1, wherein the process conditions comprise a pressure of 10-40 bara.

3. The process according to claim 2, wherein the process conditions further comprise a temperature of 400-470° C. and a WHSV of 0.5-2 h$^{-1}$.

4. The process according to claim 1, wherein the M/A/zeolite catalyst comprises an aluminosilicate zeolite having a SiO$_2$/Al$_2$O$_3$ ratio of 5-40.

5. The process according to claim 1, wherein the M/A/zeolite catalyst comprises 0.5-2 wt-% of element M.

6. The process according to claim 1, wherein element M is one or more elements selected from the group consisting of Pd and Pt.

7. The process according to claim 1, wherein the M/A/zeolite catalyst comprises 0.1-1 wt-% of element A.

8. The process according to claim 1, wherein element A is one or more elements selected from the group consisting of Na, K, Rb and Cs.

9. The process according to claim 1, wherein the aluminosilicate zeolite has a 12-ring structure.

10. The process according to claim 1, wherein the aluminosilicate zeolite comprises super cages having a size of 12-14 Å.

11. The process according to claim 1, wherein the aluminosilicate zeolite is zeolite Y.

12. The process according to claim 11, wherein the zeolite Y is partially dealuminated.

13. The process according to claim 1, wherein the hydrocarbon feed is selected from the group consisting of heavy cycle oil, light cycle oil, carbon black oil, cracked distillate and pyoil.

14. The process according to claim 1, further comprising recovering the monoaromatic hydrocarbons.

15. The process according to claim 1, wherein the hydrocarbon feed comprises at least 30 wt-% polyaromatic hydrocarbons.

16. The process according to claim 1, wherein an amount of the monoaromatic hydrocarbons produced by contacting the hydrocarbon feed with the M/A/zeolite catalyst at the pressure of ambient-40 bara, the temperature of 350-500° C., and the WHSV of 0.1-10 h$^{-1}$ is at least 30 wt-%, based on a total product of contacting the hydrocarbon feed with the M/A/zeolite catalyst at the pressure of ambient-40 bara, the temperature of 350-500° C., and the WHSV of 0.1-10 h$^{-1}$.

17. The process according to claim 16, wherein an amount of methane produced by contacting the hydrocarbon feed with the M/A/zeolite catalyst at the pressure of ambient-40 bara, the temperature of 350-500° C., and the WHSV of 0.1-10 h$^{-1}$ is less than 0.5 wt-%, based on a total product of contacting the hydrocarbon feed with the M/A/zeolite catalyst at the pressure of ambient-40 bara, the temperature of 350-500° C., and the WHSV of 0.1-10 h$^{-1}$.

18. The process according to claim 1, wherein an amount of methane produced by contacting the hydrocarbon feed with the M/A/zeolite catalyst at the pressure of ambient-40 bara, the temperature of 350-500° C., and the WHSV of 0.1-10 h$^{-1}$ is less than 0.5 wt-%, based on a total product of contacting the hydrocarbon feed with the M/A/zeolite catalyst at the pressure of ambient-40 bara, the temperature of 350-500° C., and the WHSV of 0.1-10 h$^{-1}$.

19. A process for producing monoaromatic hydrocarbons from a hydrocarbon feed comprising polyaromatics, the process comprising
　　contacting the hydrocarbon feed in the presence of hydrogen with a M/A/zeolite catalyst at a pressure of ambient-40 bara, a temperature of 350-500° C., and a WHSV of 0.1-10 h$^{-1}$ to produce the monoaromatic hydrocarbons,
wherein said M/A/zeolite catalyst comprises
　　0.05-2.5 wt-% of element M, wherein said element M is one or more elements selected from Group 10 of the Periodic Table of Elements;
　　0.05-1 wt-% of element A, wherein element A is K; and the zeolite is an aluminosilicate zeolite having a pore size of 6-8 Å and a $SiO_2/Al_2O_3$ ratio of 1-45; and
the hydrocarbon feed comprises at least 10 wt-% polyaromatics.

20. The process according to claim 19, wherein:
the process conditions comprise a pressure of 10-40 bara, a temperature of 400-470° C., and a WHSV of 0.5-2 h$^{-1}$; and
the M/A/zeolite catalyst comprises 0.5-2 wt-% of Pt and 0.1-1 wt-% of K.

21. The process according to claim 19, wherein said element A covers acid sites of the zeolite.

* * * * *